Figure 1:
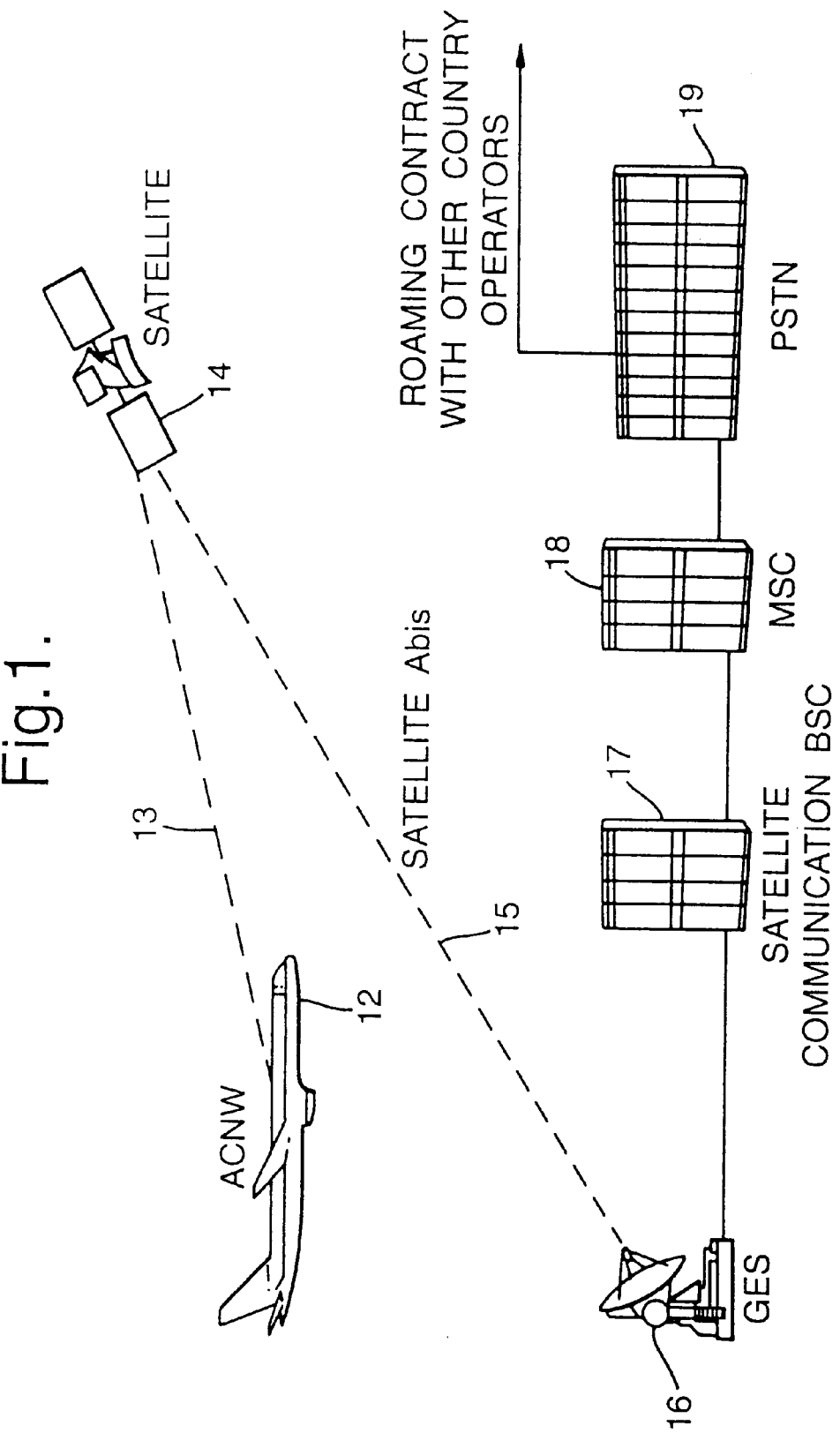

United States Patent [19]
Sinivaara

[11] Patent Number: 6,055,425
[45] Date of Patent: Apr. 25, 2000

[54] AERONAUTICAL CELLULAR NETWORK

[75] Inventor: Hasse Kristian Sinivaara, Espoo, Finland

[73] Assignee: Nokia Telecomunications Oy, Espoo

[21] Appl. No.: 09/077,477

[22] PCT Filed: Nov. 11, 1996

[86] PCT No.: PCT/EP96/04912

§ 371 Date: May 29, 1998

§ 102(e) Date: May 29, 1998

[87] PCT Pub. No.: WO98/21838

PCT Pub. Date: May 22, 1998

[51] Int. Cl.[7] ............ H04B 7/185; H04B 10/00; H04B 10/24
[52] U.S. Cl. ............ 455/431; 455/424; 455/463; 455/500; 455/20; 370/310; 359/152; 359/173
[58] Field of Search ................ 455/431, 424, 455/500, 507, 48, 463, 20, 22, 5.1, 6.1, 63; 370/316, 310, 317, 338; 340/825.06; 359/152, 173

[56] References Cited

U.S. PATENT DOCUMENTS

| | | | |
|---|---|---|---|
| 5,140,451 | 8/1992 | Talat et al. | 359/114 |
| 5,438,610 | 8/1995 | Bhagat et al. | 455/431 |
| 5,651,050 | 7/1997 | Bhagat et al. | 455/431 |
| 5,805,683 | 9/1998 | Berberich, Jr. | 455/431 |
| 5,880,867 | 3/1999 | Ronald | 359/152 |
| 5,884,166 | 3/1999 | Ray et al. | 455/431 |
| 5,887,258 | 3/1999 | Lemozit et al. | 455/431 |
| 5,920,826 | 7/1999 | Metso et al. | 455/557 |

FOREIGN PATENT DOCUMENTS

WO 96/02094   1/1996   WIPO.

OTHER PUBLICATIONS

"An Overview of Aeronautical Telecommunications In Europe and World–Wide", Pettifor et al., BT Technology, vol. 14, No. 3, Jul. 1996, pp. 64–73.
PCT International Search Report.

*Primary Examiner*—Lee Nguyen
*Assistant Examiner*—Simon Nguyen
*Attorney, Agent, or Firm*—Perman & Green, LLP

[57] ABSTRACT

A cellular telephone system for use in an aircraft (12) comprises a plurality of user terminals distributed throughout the seating array, each group of terminals being connected through short cables to an optical/RF transducer (30) which is linked through an optical fibre array (50) to a further transducer (26) connected by short cables (27,28) to a Base Transceiver Station (22).

12 Claims, 4 Drawing Sheets

AERONAUTICAL CELLULAR NETWORK

The invention relates to an aeronautical cellular network and includes a cellular telephone system for use within an aircraft.

The invention is particularly applicable to the use of cellular telephone systems such as GSM or DCS cellular systems. It is well known that mobile telephones using such systems may not be used in aircraft due to the possibility of interference with aircraft equipment. Any transmitted radio frequency power level within an aircraft must be very low to avoid interference and any extended length of radio frequency cables is also liable to cause interference. The distribution of seat positions within an aircraft makes it impossible to have equal signal distribution from a plurality of user locations within the aircraft to a common Base Transceiver Station (BTS) which may form part of the communication path to the exterior of the aircraft.

An object of the present invention is to provide an improved telephone system for use within an aircraft which avoids unwanted interference.

The present invention provides a cellular telephone system for use within an aircraft which comprises a plurality of user terminals distributed within an aircraft for location each adjacent a seat or a group of seats, an optical interface system distributed throughout the aircraft and comprising a plurality of optical fibres, interconnecting an array of transducer units with a master unit, each transducer unit and said master unit providing a bidirectional communication path with conversion between optical and radio signals, each transducer unit being located near and connected to a user terminal or group of user terminals by respective cable connections, said master unit being connected to a Base Transceiver Station (BTS) within the aircraft, said base Transceiver Station being connected to an Aeronautical Earth Station (AES) for transmitting and receiving signals via satellite to a Ground Earth Station.

Preferably each transducer unit is connected to a plurality of user terminals through one or more power splitting devices to provide equal signal strength to each user terminal connected to the transducer unit.

Preferably the optical interface system provides a plurality of uplink and downlink communication paths between the user terminals and the master unit whereby a plurality of users may communicate simultaneously through the Base Transceiver Station.

The invention also provides a method of operating a cellular telephone system within an aircraft, which method comprises establishing a radio frequency connection through a cable connection from a user terminal in the aircraft to a transducer located close to the user terminal, effecting bidirectional conversion between radio frequency signals and optical signals in said transducer, providing an optical signal through an optical fibre network distributed throughout the aircraft and providing a connection between a master unit and a plurality of said transducers, effecting bidirectional conversion between radio frequency signals and optical signals in said master unit, and providing a screened radio frequency cable connection between said master unit and a Base Transceiver Station for use in input and output of telephone messages.

Figure 2:
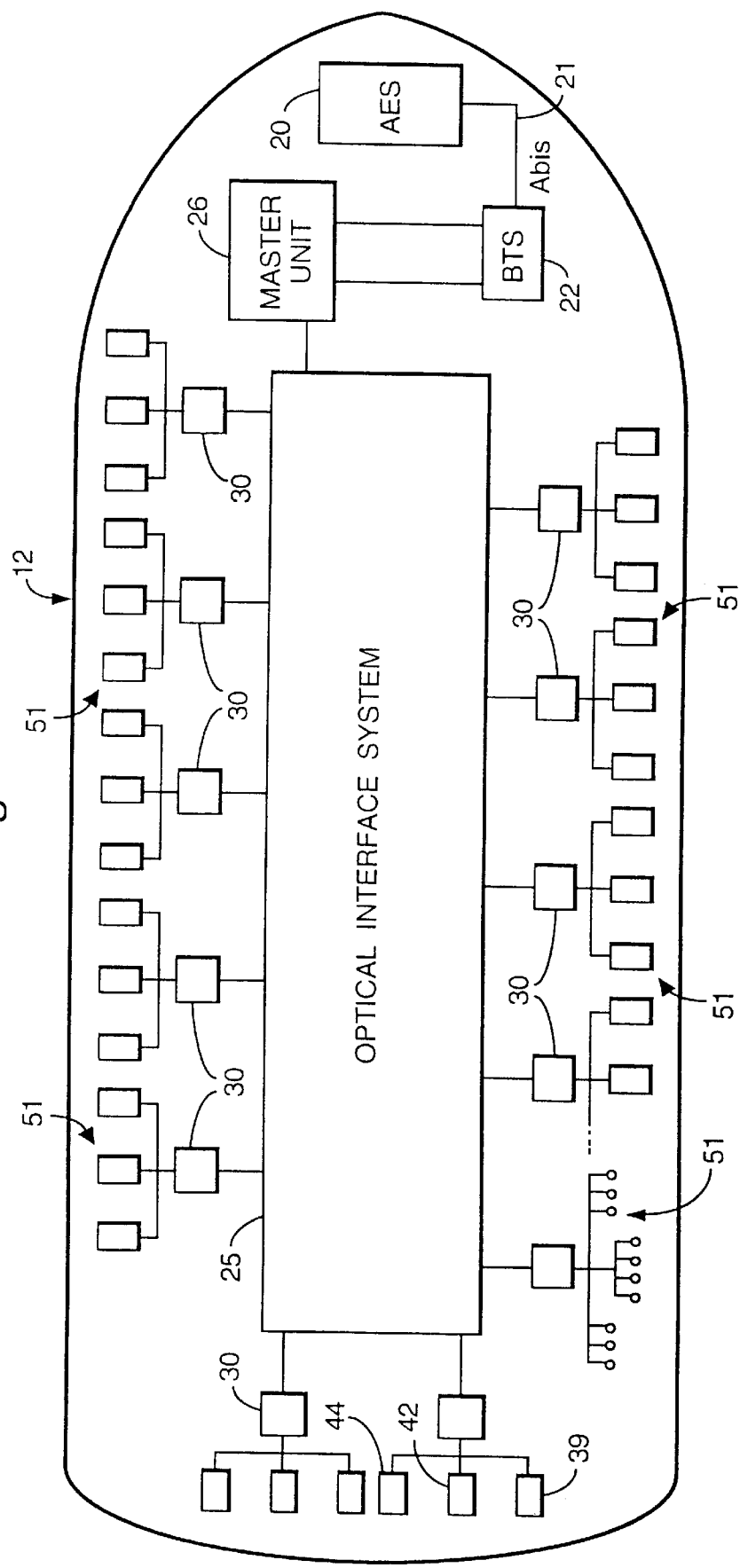
Figure 3:
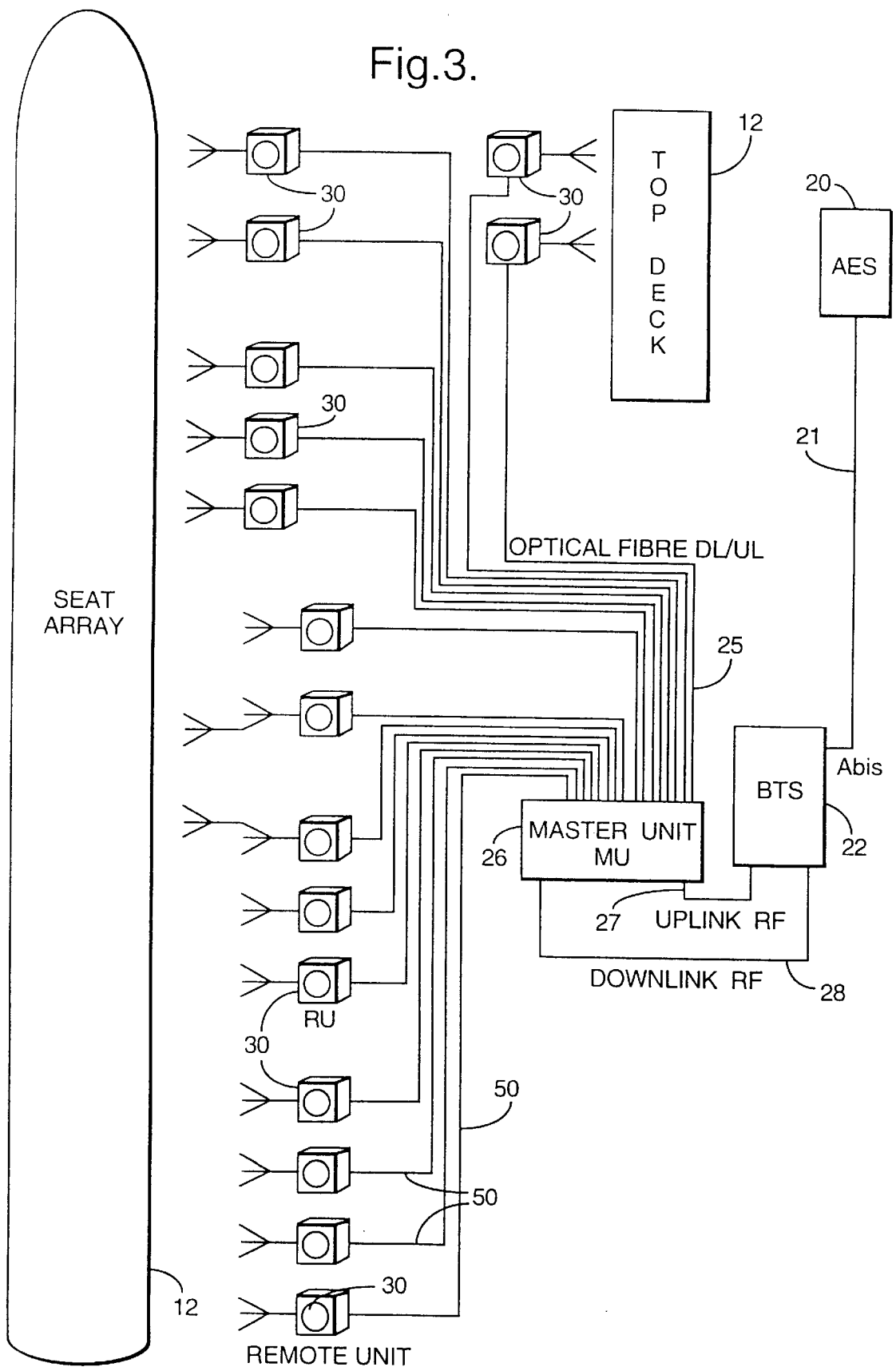
Figure 4:
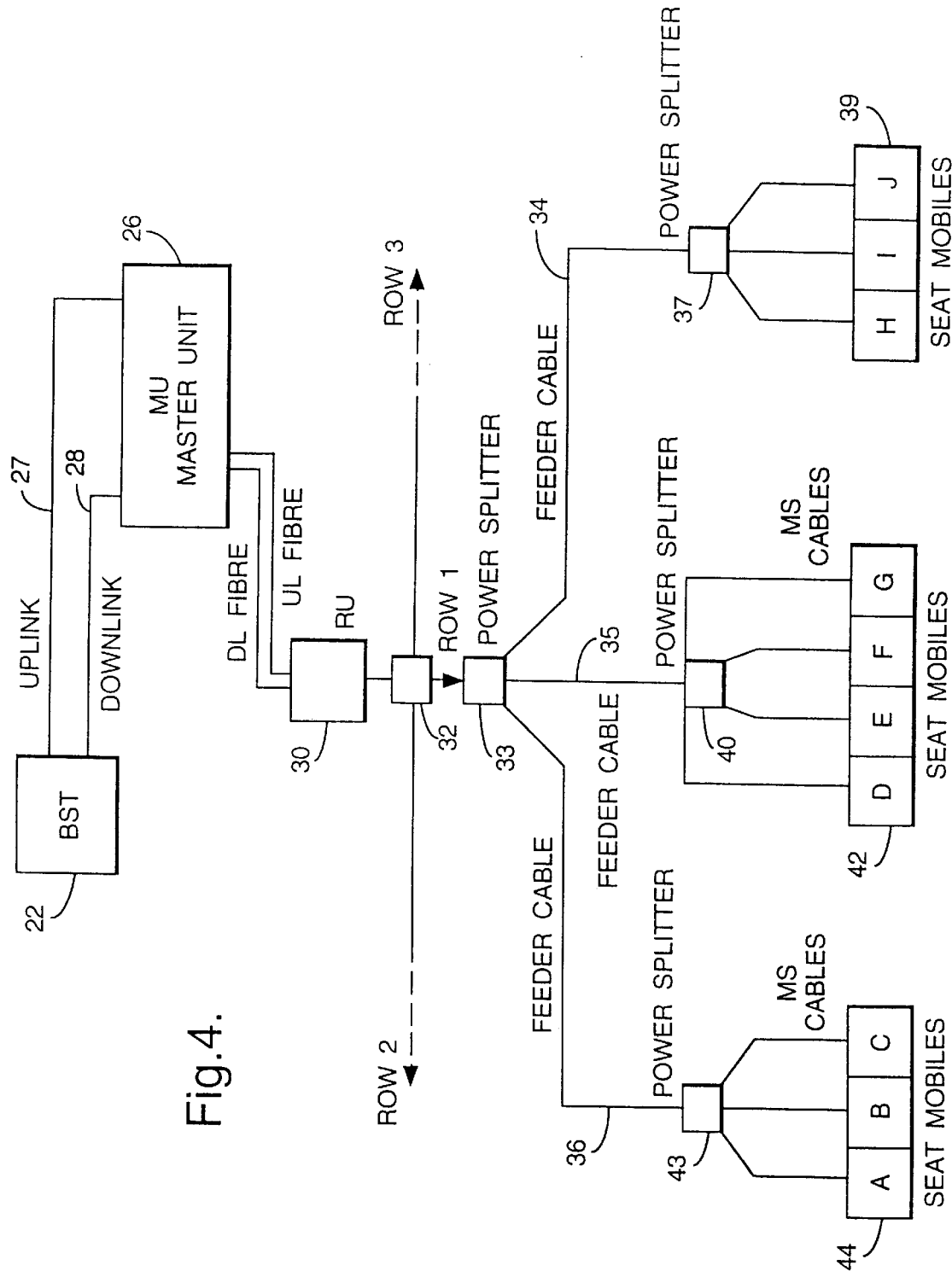

An embodiment of the invention will now be described by way of example and with reference to the accompanying drawings in which:

FIG. 1 is a schematic view of a telephone communication system between users in an aircraft and an earth system, FIG. 2 shows schematically a view of the telephone communication paths within the aircraft in accordance with the invention, FIG. 3 shows a more detailed view of the system of FIG. 2, and FIG. 4 shows further details of the system of FIG. 3.

The telephone system of this example enables subscribers to a cellular mobile telephone system to use telephones within an aircraft without causing interference with the aircraft systems. The system is particularly applicable to subscribers to a known GSM/DCS network in which the user has a SIM card which the user may locate in a receptor in a phone to use the services available to him. The system may however be used with any available cellular system.

In the general scheme shown in FIG. 1, a plurality of users within an aircraft 12 are able to transmit or receive telephone messages through an Aeronautical Earth Station (AES) located within the aircraft 12 which communicates through a satellite 14 to a Ground Earth Station 16 using Abis links 13 and 15 to and from the satellite. The Ground Earth Station 16 communicates through a satellite communication Base Station Controller (BSC) 17 to a Mobile Switching Centre (MSC) 18 linked to a Public Service Telephone Network (PSTN) 19. The operation of the Base Station Controller 17, Mobile Switching Centre 18 and Public Service Telephone Network 19 are conventional in established cellular telephone networks. In this case however the BSC 17 is dedicated to a specific group of Base Transceiver Stations (BTS) in a plurality of aircraft so that those BTS are always controlled by the same BSC 17.

To avoid interference within the aircraft an optical interface system is used as shown in FIGS. 2, 3 and 4. The input and output of telephone messages to and from the aircraft are handled by an Aeronautical Earth Station 20 connected through an Abis link 21 to a Base Transceiver Station 22 each operating in known manner for a GSM Cellular Telephone System. However, to avoid interference with radio frequency signals between user telephones and the Base Transceiver Station 22, an Optical Interface System 25 is distributed throughout the aircraft. The Optical Interface System comprises a plurality of optical fibres providing uplink and downlink connections between the Base Transceiver Station 22 and a plurality of phones, such as mobile cellular phones, distributed at each seat or group of seat positions around the aircraft. One end of the optical fibre system is connected to a master unit 26 which converts optical signals to radio frequency signals in both directions so as to allow bidirectional communication through the system. The master unit 26 is connected to the Base Transceiver Station 22 by an uplink cable 27 and a downlink cable 28 each comprising a coaxial cable screened to provide interference-free communication over the short length between the master unit 26 and the Base Transceiver Station 22. The long communication paths throughout the aircraft to each of the users are provided by the optical cables within the optical interface system 25. The optical fibres are connected to a plurality of transducer units 30 located at a plurality of spaced locations around the aircraft. Each transducer unit 30 is located in the vicinity of a group of seats. In this particular example shown in FIG. 3 and FIG. 4 each transducer unit services three rows of seats each row comprising 10 seats. Each transducer 30 which forms a remote unit (RU) is connected through screened coaxial cables to a plurality of user terminals which in this example are provided at each seat location in the aircraft. To provide equal signal distribution to each location, each transducer unit 30 is connected through a series of power splitters to the respective user terminals. In the arrangement shown in FIG. 4, each transducer 30 is connected through a first power splitter 32 to provide three respective equal power outputs to row 1, row 2 and row 3 of seats which are connected to that transducer. FIG. 4 shows more detail of the connections made to row 1. In that case the output from power splitter 32 is passed through a second power splitter 33 in order to provide feeder cable connections 34,35 and 36 to respective groups of seats in a common row. Cable 34 passes through a further power splitter 37 to provide three separate equal power connections to the three seats forming a group of seats 39. Similarly cable 35 is connected to a power splitter 40 which provides four equal power connections to the four seats forming a further group of seats 42. Cable 36 is connected through a power splitter 43 to provide three equal power connections to the three seats forming a further group 44. Each of the power splitters described is arranged so that each seat location which provides a user terminal, has a similar power connection to the associated transducer 30. The transducers and power splitters are arranged so that all user terminals throughout the aircraft experience similar power connections to the system.

In this particular example each user terminal comprises a cellular phone of conventional construction located at each seat location and wire connected to the associated transducer 30. Each of these phones has a receptor for a SIM card which can be inserted by the user when he wishes to use the telephone service so that he is identified by his own telephone number indicated on the SIM card and the cost is billed to his own account.

The optical fibres 50 used in the interface system 25 are shown more fully in FIG. 3 wherein each remote unit 30 is connected by respective optic fibre connections to the common master unit 26. The individual user terminals are indicated at 51 for a limited selection of user positions in FIG. 2. They have been omitted for clarity in FIG. 3.

In the examples shown in FIGS. 3 and 4, the master unit 26 is arranged to send a pilot signal, for example 10 MHz to each of the remote units 30 and from the remote units 30 back to the master unit 26 so that there is a continuous loop which detects the quality of the fibre optic links.

It will be appreciated that in this example, the communication system within the aircraft avoids electromagnetic interference with the aircraft system. Any radio frequency communication paths are of short extent common to all users within the aircraft. The communication paths which are long and of variable length depending upon the user's location are provided by the optical fibre interface.

The invention is not limited to the details of the foregoing example.

I claim:

1. A cellular telephone system for use within an aircraft, which system comprises a plurality of user terminals distributed within an aircraft for location each adjacent a seat or a group of seats, an optical interface system for interfacing the user terminals to a Base Transceiver Station (BTS) within the aircraft, the optical interface system being distributed throughout the aircraft, and comprising a plurality of optical fibres interconnecting an array of transducer units with a master unit, each transducer unit and said master unit providing a bidirectional communication path with conversion between optical and radio signals, each transducer unit being located near and connected to a user terminal or group of user terminals by respective cable connections, said master unit being connected to the BTS, said base Transceiver Station being connected to an Aeronautical Earth Station (AES) for transmitting and receiving signals via satellite to a Ground Earth Station.

2. A cellular telephone system according to claim 1 in which each transducer unit is connected to a plurality of user terminals through one or more power splitting devices to provide equal signal strength to each user terminal connected to the transducer unit.

3. A cellular telephone system according to claim 1 in which the optical interface system provides a plurality of uplink and downlink communication paths between the user terminals and the master unit whereby a plurality of users may communicate simultaneously through the Base Transceiver Station.

4. A cellular telephone system according to claim 1 in which said optical interface system provides a broad band communication path for a full GSM or DCS band of communication.

5. A cellular telephone system according to claim 1 in which an Abis link is provided by a cable connection between said Base Transceiver Station and said Aeronautical Earth Station.

6. A cellular phone system according to claim 1 in which each user terminal comprises a cellular phone unit.

7. A cellular telephone system according to claim 6 in which each user terminal comprises a cellular phone with a receptor for a subscription identifier for a user of the telephone network.

8. A cellular telephone system according to claim 7 in which the identifier is a SIM card.

9. A method of operating a cellular telephone system within an aircraft, which method comprises establishing a radio frequency connection through a cable connection from a user terminal in the aircraft to a transducer located close to the user terminal, effecting bidirectional conversion between radio frequency signals and optical signals in said transducer, providing an optical signal through an optical fibre network distributed throughout the aircraft and providing a connection between a master unit and a plurality of said transducers, effecting bidirectional conversion between radio frequency signals and optical signals in said master unit, and providing a screened radio frequency cable connection between said master unit and a Base Transceiver Station for use in input and output of telephone messages.

10. A method according to claim 9 in which optical signals are used to communicate between the master unit and a plurality of said transducers distributed around the aircraft and each transducer communicates with a plurality of user terminals with power splitting to provide equal power connections to each terminal.

11. A method according to claim 9 in which communication is effected through a cable between the said Base Transceiver Station and an Aeronautical Earth Station in the aircraft.

12. An aircraft cellular phone system comprising:

an Aeronautical Earth Station (AES) within an aircraft, the AES being capable of transmitting and receiving signals via satellite to a Ground Earth Station, the AES being communicably connected to a Base Transceiver Station (BTS) within the aircraft;

user terminals disposed within the aircraft, each user terminal being capable of bi-directional RF communication with the BTS; and an optical interface system within the aircraft for bi-directionally communicating RF signals between the user terminals and BTS, the optical interface system comprising optical fibers, at least one transducer unit, and a master unit, wherein the transducer unit is connected to at least one of the user terminals for converting between optical and RF signals, the master unit is connected to the BTS for converting between optical and RF signals, and the optical fibers connect the transducer unit and master unit for conducting optical signals therebetween.

* * * * *